(12) United States Patent
de Clercq

(10) Patent No.: US 6,206,413 B1
(45) Date of Patent: Mar. 27, 2001

(54) STEERING WHEEL WITH INTEGRATED AIRBAG UNIT

(75) Inventor: Stephani de Clercq, München (DE)

(73) Assignee: Autoliv Development AB (SE)

( * ) Notice: Subject to any disclaimer, the term of this patent is extended or adjusted under 35 U.S.C. 154(b) by 0 days.

(21) Appl. No.: 09/171,995

(22) PCT Filed: Apr. 25, 1997

(86) PCT No.: PCT/DE97/00832

§ 371 Date: Mar. 5, 1999

§ 102(e) Date: Mar. 5, 1999

(87) PCT Pub. No.: WO97/41006

PCT Pub. Date: Nov. 6, 1997

(30) Foreign Application Priority Data

Apr. 27, 1996 (DE) .............................. 196 16 977

(51) Int. Cl.[7] .................................................. B60R 21/16
(52) U.S. Cl. .................................... 280/731; 280/728.2
(58) Field of Search ............................... 280/731, 728.2, 280/728.3

(56) References Cited

U.S. PATENT DOCUMENTS 3,600,003 * 8/1971 Carey ............................... 280/731
3,822,894 * 7/1974 Muller et al. ..................... 280/731
3,907,330   9/1975 Kondo et al. ..................... 280/731
4,101,146 * 7/1978 Oehm ................................ 280/731
5,609,356 * 3/1997 Mossi ............................... 280/731
5,676,396 * 10/1997 Fohl ................................. 280/731

FOREIGN PATENT DOCUMENTS

3126079 * 4/1982 (DE) ................................. 280/731
0615889   9/1994 (EP) .
2287305   9/1995 (GB) .

* cited by examiner

Primary Examiner—Lanna Mai
Assistant Examiner—Ruth Ilan
(74) Attorney, Agent, or Firm—Robert W. Becker & Associates

(57) ABSTRACT

A steering wheel assembly has a container having a bottom and an upper end. The upper end has an opening delimited by a rim. A gas generator is mounted at the bottom in the container. A gas bag has a mouth with an edge portion. The gas bag is folded into the container so as to be positioned between the gas generator and the opening. the edge portion is placed onto the container rim. A steering wheel member is placed onto the edge portion and secured to the upper end of the container by clamping the edge portion of the gas bag between the container rim and the steering wheel member.

5 Claims, 1 Drawing Sheet

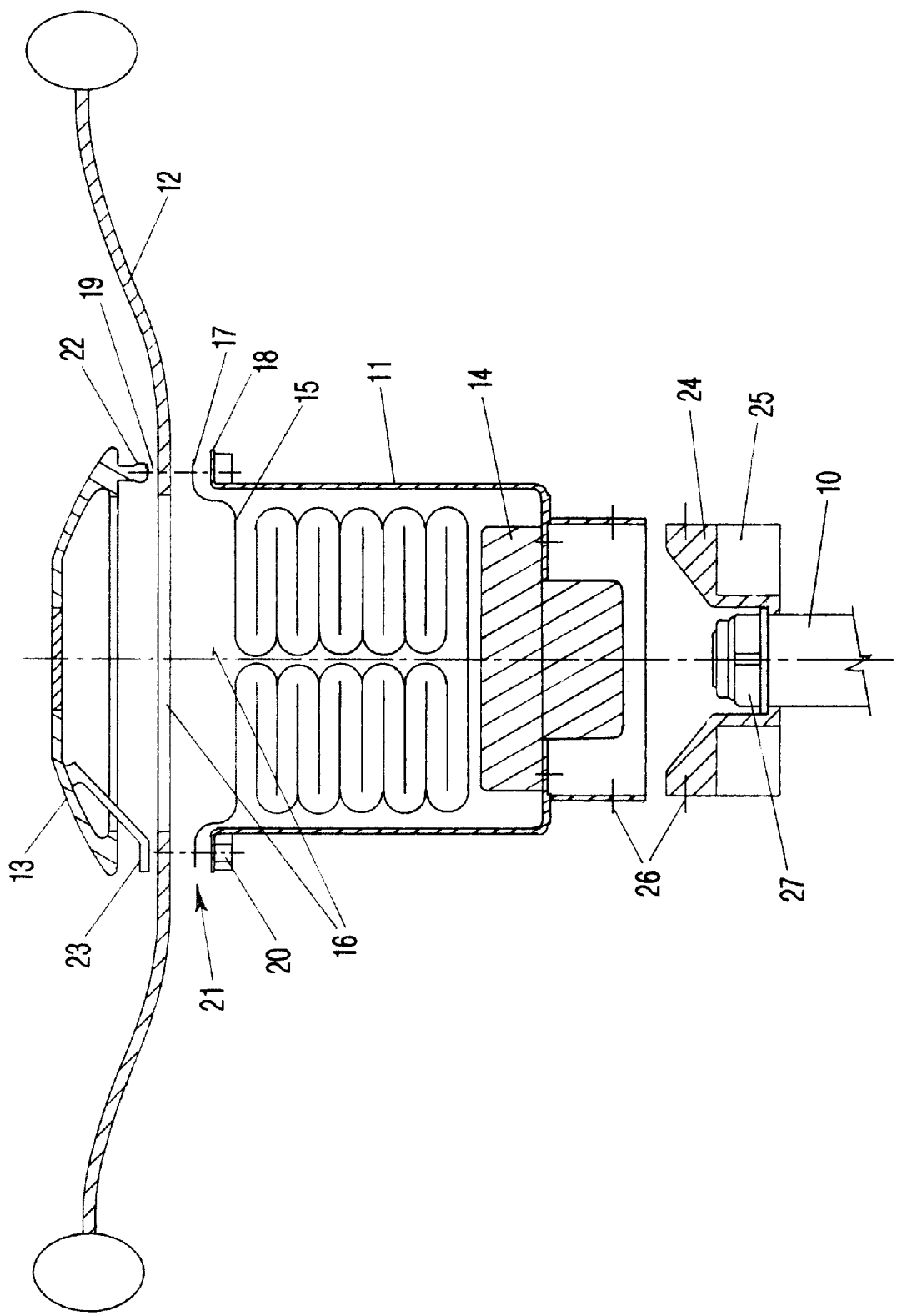

STEERING WHEEL WITH INTEGRATED AIRBAG UNIT

BACKGROUND OF THE INVENTION

The invention relates to a steering wheel with steering wheel member and a container connected thereto for receiving a gas generator as well as a gas bag folded into the container. A cover for covering the outlet opening for the gas bag and designed to open is provided, whereby the steering wheel is to be connected to a steering column of a motor vehicle.

A steering wheel with the aforementioned features is known from British Patent Application 2 287 305 in which the steering wheel is provided with a recess placed onto the cup-shaped container that contains the folded gas bag and the gas generator. The container and steering wheel member of the steering wheel are fastened together by respectively arranged flanges to a support part which, in turn, is connected to or connectable to the steering column of a motor vehicle. The gas bag is connected with an edge portion surrounding the gas bag mouth by separate fastening means, respectively, according to one embodiment of the known steering wheel, is clamped between parts placed on top of one another, i.e., the container bottom and the gas generator such that the gas bag with its gas bag mouth is positioned at the gas generator and extends in the direction of unfolding above the gas generator and above its clamping plane.

The known steering wheel has the disadvantage that the recess in the steering wheel for receiving the container and the container itself are embodied with relatively large surface areas so that such an arrangement can not be used especially for steering wheels of sports vehicles in which a very open spoke arrangement at the steering wheel member is preferred. Also, the steering wheel with the integrated cover and steering wheel member and must be adapted in its shape to the container so that the components of the steering wheel with integrated airbag unit can not be varied. Furthermore, the known steering wheel is comprised of a plurality of individual parts which can not be preassembled in a sensible manner so that mounting of the known steering wheel assembly itself as well as mounting on the vehicle is complicated.

It is an object of the invention to eliminate for a steering wheel with the aforementioned features the aforementioned disadvantages.

SUMMARY OF THE INVENTION

The basic idea of the invention is that the container can be connected with its end that receives the gas generator to the steering column, that the steering wheel member is positioned on and connected to the upper end of the container having the outlet opening, and that the gas bag with its gas bag mouth and the surrounding edge portion is clamped between the steering wheel member and the container and that the gas bag mouth is folded into the interior of the container such that the closed envelope of the gas bag is positioned between the gas generator and the outlet opening. The invention has the advantage that the container is used for transmitting forces and moments resulting from the steering process because the container is the only connection between the steering wheel member and the steering column of the motor vehicle because the container is positioned below the steering wheel member and is arranged between it and the steering column and is a connected respectively to these parts. Because of this arrangement, the gas bag with the edge portion surrounding the gas bag mouth is clamped between the steering wheel member and the housing and is folded through the gas bag mouth into the interior of the housing such that the closed envelope of the gas bag is positioned between the gas generator and the outlet opening. This deviates from the known concept of the prior art to place the gas bag mouth about the gas generator and to fasten it in the area of the gas generator so that the gas bag in its folding arrangement is positioned in the inflation direction above the gas generator. In the invention, the gas bag is positioned below the clamping plane and thus unfolds upon inflation through the outlet opening in the steering wheel member outwardly. Accordingly, the housing can have a cylindrical or relative narrow design so that at the respective end of the housing only a comparatively small outlet opening results which allows the embodiment of open spokes at the steering wheel member. This allows for the desired sporty design of a steering wheel with integrated airbag unit. Furthermore, the design allows the use of different steering wheel members for unchanged airbag modules. As a further advantage it should be noted that only comparatively few individual parts must be mounted whereby the steering wheel member can be pre-mounted to the container and the cover so that the final assembly at the steering column of the vehicle is simplified.

According to one embodiment of the invention, the container at its end facing the steering wheel member has a laterally projecting flange whereby the steering wheel member is connected to the flange by threaded connections distributed about its circumference. This has the advantage that different steering wheel members can be placed onto the container flange and to thus realize different steering wheel designs because the respective steering wheel member has as its only design requirement the provision of fastening possibilities for the threaded connections to the container flange.

According to one embodiment of the invention, it may be expedient that the cover is snapped into place by snap-in pins that penetrate openings in the steering wheel member and engage openings in the container flange so that an advantageous simple assembly is provided. It may be expedient to arrange the threaded connections and the snap-in connections alternatingly about the circumference of the flange of the container.

For fastening the edge portion of the gas bag it is suggested that the threaded connections and the snap-in connections penetrate the edge portion of the gas bag between the steering wheel member and the flange of the container. This has the advantage that the fastening action for the gas bag is realized over large surface areas about a large circumference portion and at a location remote from the gas generator so that the forces acting during the sudden inflation process onto the respective fastening locations are reduced.

According to one embodiment of the invention it is suggested that the container is provided at its end correlated with the gas generator with an adaptor for connection to the steering column of a motor vehicle whereby the adaptor has a receiving space for a coil spring integrated into the adaptor. First, the adaptor is to be connected to the steering column of the vehicle and, subsequently the container with the pre-assembled parts such as the steering wheel member and the cover are to be connected to the adaptor.

According to one embodiment of the invention, the housing is a crumple part with a deformable wall so that the inventive design further improves the functionality such that in addition to impact reduction by the steering wheel member and the inflated gas bag, the steering wheel assembly in the longitudinal direction toward the steering column is embodied as a crumple zone so that it can receive a respective impact load.

BRIEF DESCRIPTION OF THE DRAWINGS

FIG. 1 shows a steering wheel assembly with integrated airbag unit in a schematic side view.

DESCRIPTION OF THE PREFERRED EMBODIMENTS

A steering wheel assembly comprised of a container 11, a steering wheel member 12 connected thereto, and a cover 13 placed thereon can be placed onto the steering column 10 of a motor vehicle and can be attached thereto.

The container 11 receives a gas generator 14 at the end that faces the steering column 10. Furthermore, a gas bag 15 is folded into the container 11 whereby the outlet opening 16 surrounded by the edge portion 17 of the gas bag 15 is connected to the end of the container 11 opposite the gas generator 14 in a manner to be disclosed in the following. The gas bag 15 is folded through the gas bag mouth inwardly through the outlet opening 16 into the container 11 such that the closed envelope of the gas bag 15 is positioned between the gas generator 14 and the outlet opening 16.

For attaching the steering wheel member 12 to the container 11, the upper end of the container 11 is provided with a laterally outwardly projecting flange 18 with openings 20 provided thereat. The steering wheel member 12 with correlated openings 19 can be placed onto the flange 18 so that threaded connections 21 for fastening the steering wheel member 12 to the container 11 can be applied. In order to simplify the mounting of the cover 13 at the steering wheel member 12, the cover 13 is snapped onto the steering wheel member 12, respectively, the container 11 whereby the cover 13 is provided with snap-in pins 22 that penetrate, respectively, engage, correlated openings 19, 20 within the steering wheel member 12 and the flange 18. For securing the cover 13 at the steering wheel during, respectively, after folding of the gas bag 15, a catch strap 23 is provided which with one end is connected to the cover 13 and with the other end is clamped between the cover 13 and the steering wheel member 12.

For attaching the steering wheel, respectively, its container to the steering column 10 of the motor vehicle, an adaptor 24 is provided which with respect to its attachment 27 on the steering column 10 can be embodied according to the steering column of the motor vehicle. The adaptor 24 can be provided with a receiving space 25 for a coil spring. After attachment of the adaptor 24 on the steering column 10 by a corresponding fastening means 27, the container 11 can be placed onto the adaptor 24 and fastened thereat by respectively provided fasteners 26 so that rotation of the steering wheel, respectively, steering wheel member 12 is transmitted via the container 11 and the adaptor 24 onto the steering column 10 of the vehicle.

The wall of the container 11 can be embodied so as to be deformable under load.

The present invention is, of course, in no way restricted to the specific disclosure of the specification and drawings, but also encompasses any modifications within the scope of the appended claims.

What is claimed is:

1. A steering wheel assembly comprising:

a container (11) having a bottom and an upper end;

said upper end having an opening (16) delimited by a rim (18);

a gas generator (14) mounted at said bottom in said container (11);

a gas air bag (15) having a mouth with an edge portion (17);

said gas bag (15) folded into said container (11) so as to be positioned between said gas generator (14) and said opening (16);

said edge portion (17) placed onto said rim (18) of said container (11);

a steering wheel member (12) placed onto said edge portion (17) and secured to said upper end of said container (11) so as to clamp said edge portion (17) of said gas bag (15) between said rim (18) of said container (11) and said steering wheel member (12);

wherein said rim (18) of said container (11) has an outwardly projecting flange (18) and wherein said steering wheel member (12) is connected to said outwardly projecting flange (18); and a cover (13) having snap-in means (22), wherein said steering wheel member (12) has throughbores (19) and wherein said outwardly projecting flange (18) has through openings (20) aligned with said throughbores (18), wherein said cover (13) is connected to said steering wheel member (12) and said container (11) by said snap-in means (22) penetrating said throughbores (19) and said through openings (20).

2. A steering wheel assembly according to claim 1, wherein said steering wheel member (12) is connected to said outwardly projecting flange (18) by circumferentially arranged threaded connections (21), wherein said snap-in means are snap-in pins (22), and wherein said snap-in pins (22) and said threaded connections (21) alternate in a circumferential direction of said outwardly projecting flange (18).

3. A steering wheel assembly according to claim 1, wherein said steering wheel member (12) is connected to said outwardly projecting flange (18) by circumferentially arranged threaded connections (21), wherein said snap-in means are snap-in pins (22), and wherein said snap-in pins (22) and said threaded connections (21) penetrate said edge portion (17) of said gas bag (15).

4. A steering wheel assembly according to claim 1, wherein said container (11) has a deformable container wall and functions as a crumple part.

5. A steering wheel assembly according to claim 1, further comprising an adapter (24) connected to said bottom of said container (11), wherein said adapter (24) is designed to connect said steering wheel assembly to a steering column of a vehicle, said adapter (24) having a receiving space (25) for a coil spring.

* * * * *

UNITED STATES PATENT AND TRADEMARK OFFICE
CERTIFICATE OF CORRECTION

PATENT NO.    : 6,206,413 B1
DATED         : March 27, 2001
INVENTOR(S)   : de Clercq It is certified that error appears in the above-identified patent and that said Letters Patent is hereby corrected as shown below:

<u>Title page,</u>
Item [57], should read as follows:

[57], ABSTRACT,
   A steering wheel assembly has a container having a bottom and an upper end. The upper end has an opening delimited by a rim. A gas generator is mounted at the bottom in the container. A gas bag has a mouth with an edge portion. The gas bag is folded into the container so as to be positioned between the gas generator and the opening. The edge portion is placed onto the container rim. A steering wheel member is placed onto the edge portion and secured to the upper end of the container by clamping the edge portion of the gas bag between to container rim and the steering wheel member.

Signed and Sealed this

Fifth Day of March, 2002

*Attest:*

JAMES E. ROGAN
*Attesting Officer*    *Director of the United States Patent and Trademark Office*